United States Patent [19]

Rosengren

[11] Patent Number: 4,852,465
[45] Date of Patent: * Aug. 1, 1989

[54] CARRIER BRACKET FOR POWER CYLINDER

[75] Inventor: Gary W. Rosengren, Brooklyn Park, Minn.

[73] Assignee: Tol-O-Matic, Inc., Minneapolis, Minn.

[*] Notice: The portion of the term of this patent subsequent to Feb. 16, 2005 has been disclaimed.

[21] Appl. No.: 151,839

[22] Filed: Feb. 3, 1988

Related U.S. Application Data

[63] Continuation-in-part of Ser. No. 810,403, Dec. 18, 1985, Pat. No. 4,724,744.

[51] Int. Cl.⁴ .............................................. F01B 29/00
[52] U.S. Cl. .......................................... 92/88; 92/128; 92/153
[58] Field of Search ............... 92/88, 128, 153, 178; 384/39, 40, 42; 248/279, 297.2, 316.1

[56] References Cited

U.S. PATENT DOCUMENTS 3,464,882  9/1969  Morton .......................... 384/42 X
4,664,020  5/1987  Kaiser ............................... 92/88
4,685,383  8/1987  Ruchser ........................... 92/88
4,724,744  2/1988  Rosengren ....................... 92/88

FOREIGN PATENT DOCUMENTS 1400285  10/1968  Fed. Rep. of Germany ........ 384/42

Primary Examiner—Robert E. Garrett
Assistant Examiner—Mark A. Williamson
Attorney, Agent, or Firm—Dorsey & Whitney

[57] ABSTRACT

A carrier bracket for use with a power cylinder of the type having an elongated cylinder member and a reciprocally movable piston therein for transferring reciprocal movement of the piston to a desired workpiece. The carrer bracket includes a central bracket portion, a pair of guide arms extending outwardly from the central bracket portion in which each of the guide arms is provided with elongated surface, a mechanism to permit limited flexing movement of the arms relative to the central bracket so as to facilitate the limited selective movement of the arms toward and away from one another and a device for causing the limited selective movement of the arms toward and away from one another.

10 Claims, 3 Drawing Sheets

CARRIER BRACKET FOR POWER CYLINDER

This is a continuation-in-part application of co-pending application Ser. No. 810,403 filed Dec. 18, 1985, now issued as U.S. Pat. No. 4,724,744 on Feb. 16, 1988.

BACKGROUND OF THE INVENTION

The present invention relates generally to a carrier bracket for use with a power cylinder, and more particularly, to a carrier bracket for use in transfering reciprocal movement from a piston within a power cylinder to a desired work piece.

Several types of power cylinders currently exist in the art including, among possible others, cable cylinders, band cylinders and rodless cylinders. The carrier bracket of the present invention has particular application to rodless cylinders of the type described in U.S. Pat. No. 4,545,290. Such a rodless cylinder includes an elongated cylinder member, an elongated, longitudinally extending slot, a piston reciprocally movable within the cylinder member, a sealing means for successively sealing the slot during reciprocal movement of the piston and a piston bracket for transfering the reciprocal movement of the piston to a point outside of the cylinder. In some applications, this piston bracket is connected directly to the desired work piece for transfering reciprocal movement of the piston to such work piece.

In another rodless cylinder of the type illustrated in U.S. Pat. No. 4,644,020, the piston bracket includes integral arms extending outwardly from the piston portion of the bracket to the outer surface of the cylinder side walls. The outer ends of these arms are provided with a plurality of inwardly facing low friction wedges which bear against correspondingly shaped grooves in the side walls of the cylinder for the purpose of guiding the piston bracket during its reciprocal movement. In this structure, the low friction wedges are mounted on the ends of set screws extending through a portion of the support arms for adjusting the bearing force between the low friction wedges and the side walls of the cylinder.

Although the above mentioned structure described in U.S. Pat. No. 4,644,020 provides certain of the stability and guiding functions which the bracket of the present invention is designed to perform, its structure is quite complicated and costly to manufacture. Further, such device discloses a structure in which the carrier bracket portion is integrally formed with the piston bracket portion and in which the adjustment of the friction or bearing force provided by the low friction wedges requires a multitude of time-consuming adjustments. Accordingly, there is a need in the art for an improved carrier bracket for a power cylinder which is of relatively uncomplicated construction and easy to use and adjust, is inexpensive to manufacture and which also provides the desired stability and guidance between the carrier bracket and the cooperating cylinder.

SUMMARY OF THE INVENTION

The present invention provides for a relatively uncomplicated, inexpensive carrier bracket for use in connection with a power cylinder such as the rodless cylinder described in U.S. Pat. No. 4,545,290. Such a cylinder includes an elongated cylinder member, an elongated, longitudinally extending slot, a piston reciprocally movable within the cylinder, a sealing means for successively sealing the slot during reciprocal movement of the piston and a piston bracket extending upwardly through the slot for connection with the work piece. In the preferred embodiment of the present invention, a carrier bracket is provided for connection to two upstanding, laterally spaced connecting members of the piston bracket.

The carrier bracket of the present invention includes a pair of support or guide arms extending outwardly from a center portion and around a portion of the tubular cylinder member and a pair of cooperating guide surfaces associated with each guide arm for guiding the carrier bracket relative to the cylinder. One of each pair of guide surfaces is formed on an inner surface of the guide arm, while the other is formed on the outer surface of the cylinder. In one embodiment of the present invention, a guide rod is secured relative to each of these guide or support arms so that the rods are disposed between an inner surface portion of each of the arms and a corresponding bearing surface on the outside surface of the cylinder side walls. In such embodiment, these rods are connected at their ends to an end plate secured to each end of the carrier bracket. This connection means extends through the end plates and into the rods in a direction generally parallel to their longitudinal axis.

In a further embodiment of the present invention, the guide surface associated with each guide arm is integrally formed with an inner surface portion of the arm for cooperation with the guide surface on the cylinder. In this embodiment, the respective guide surfaces can comprise a variety of cross-sectional configurations and can be provided with a variety of surface coatings.

Means are also provided in the carrier bracket to permit limited flexing of the support arms relative to the central portion of the bracket and relative to one another for the purpose of controlling the tolerance and clearance between the rods and the side walls of the cylinder. Means are also provided in the end cap to permit this limited flexing.

In the preferred embodiment, the means for permitting the limited flexing of the support arms includes at least one narrowed section of the central portion and means for adjusting the arms toward or away from one another so as to adjust the clearance between the bearing rods or the guide surfaces and the side walls of the cylinder. A pair of threaded members extending transversely through the mounting bracket are provided for causing this adjustment.

The end plate which functions to support the individual bearing rods of one of the embodiments also includes a central portion having means for engaging the top surface of the cylinder for the purpose of removing dust therefrom and insuring proper insertion of a top sealing member into sealing engagement with the longitudinal slot.

Accordingly, it is an object of the present invention to provide an improved carrier bracket for a power cylinder which has an uncomplicated structure and is relatively inexpensive to manufacture.

Another object of the present invention is to provide a carrier bracket for a power cylinder which includes improved means for adjusting the clearance between a pair of carrier bracket guide surfaces and the cylinder side walls.

A further object of the present invention is to provide a carrier bracket for a power cylinder comprising a pair of outwardly extending arms and a guide surface associated with each arm and disposed on either side of the cylinder for operative cooperation with a corresponding guide surface on said cylinder.

These and other objects of the present invention will become apparent with reference to the drawings, the description of the preferred embodiment and the appended claims.

DESCRIPTION OF THE PREFERRED EMBODIMENT

Figure 1:
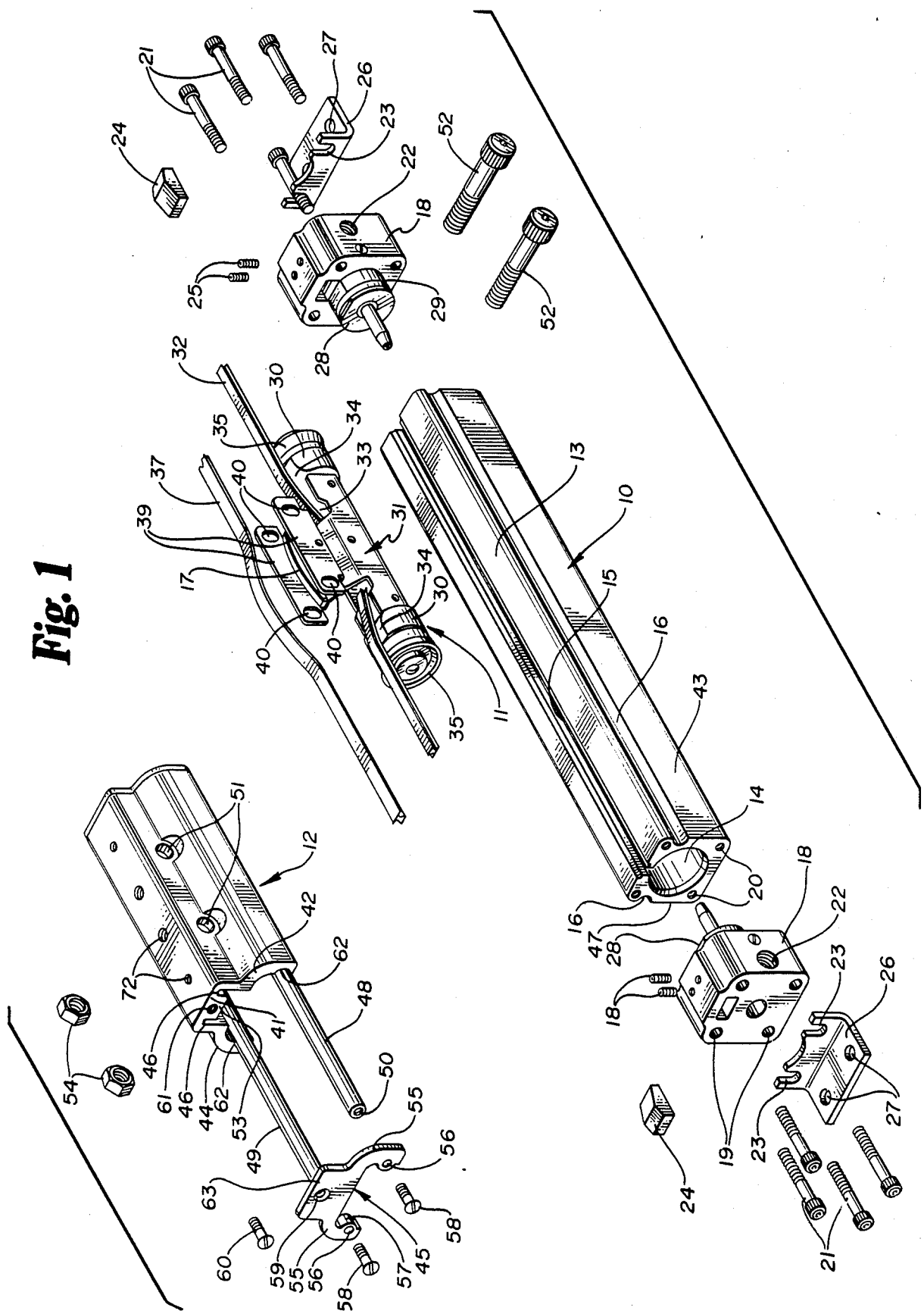
FIG. 1 is a pictorial, exploded view showing one embodiment of the carrier bracket of the present invention as used in connection with a typical power cylinder.

Reference is first made to FIG. 1 comprising a pictorial, broken part view of one embodiment of the carrier bracket of the present invention and the manner in which it is connected with a rodless power cylinder of the type with which it is intended for use. As generally illustrated in FIG. 1, the power cylinder includes an elongated cylinder assembly 10, a piston assembly 11 adapted for reciprocal movement within the cylinder 10 and a carrier bracket assembly 12. The carrier bracket assembly is connected with the piston assembly 11 and functions to stabilize movement of the piston and guide the same during its reciprocal movement within the cylinder 10.

Figure 2:
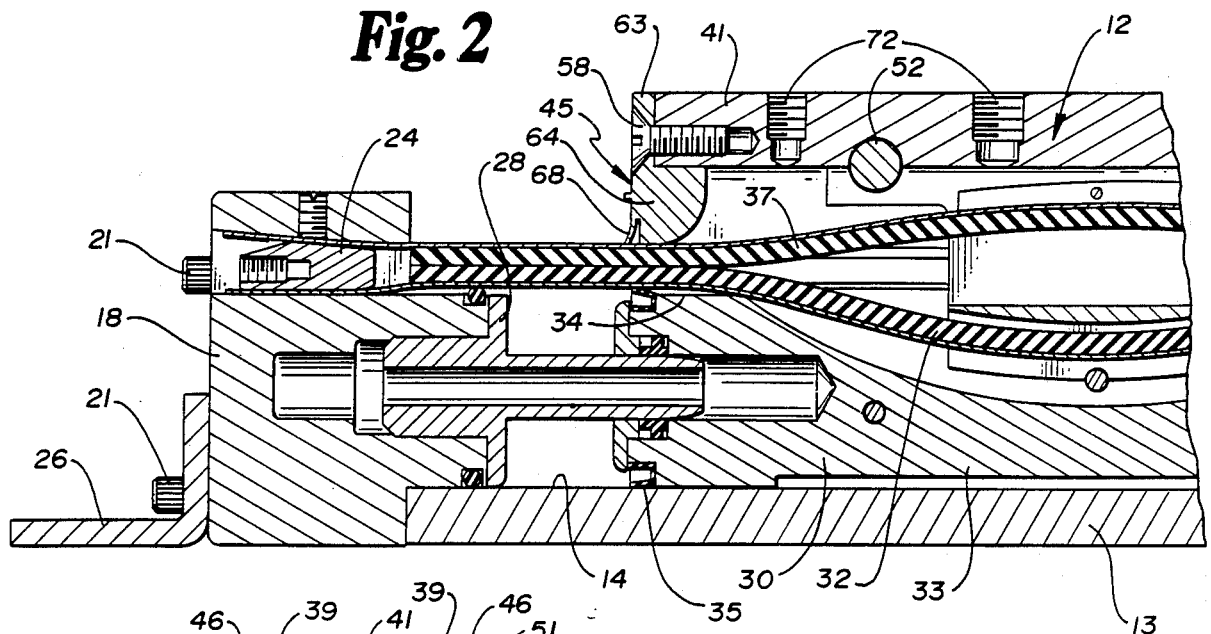
FIG. 2 is a sectional view of a portion of a power cylinder, with one embodiment of the carrier bracket of the present invention connected thereto, as viewed along a section cut vertically along the longitudinal axis of the cylinder.
Figure 3:
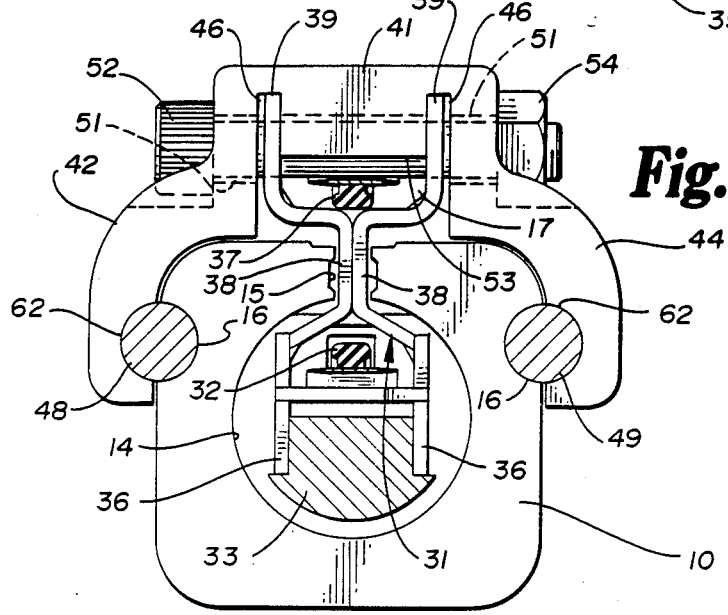
FIG. 3 is a view, partially in section, cut transversely through a power cylinder with one embodiment of the carrier bracket of the present invention connected therewith.

More specifically, as illustrated in FIGS. 1, 2 and 3, the cylinder assembly 10 includes a generally elongated tubular member or cylinder 13 having a generally cylindrical bore 14 extending throughout its entire length along its longitudinal axis. An elongated soot 15 is formed in a top wall of the cylinder member 13 and a pair of bearing surfaces comprising the guide channels or grooves 16 are formed in the side walls 43 and 47 of the cylinder member 13. As will be described in greater detail below, these guide channels or grooves 16 (one formed in each of the cylinder side walls) cooperate with corresponding bearing rods associated with the carrier bracket assembly 12 for the purpose of guiding the bracket 12 and the piston assembly 11 during its reciprocal movement.

An end cap or head assembly 18 is connected to each end of the cylinder member 13. Each head assembly 18 is provided with a plurality of openings 19 which are generally aligned with corresponding threaded openings 20 in the ends of the cylinder member 13. A like number of threaded members 21 extend through the openings 19 in each head assembly 18 for threaded connection into the openings 20. By tightening the threaded members 21, the head assemblies 18 are secured to a respective end of the cylinder member 13 in a fixed, sealed relationship. A portion 28 extends inwardly from each of the head assemblies 18 for insertion into the cylindrical bore 14 of the cylinder member 13. A peripheral portion of each of these portions 28 is provided with an O-ring or other sealing member 29 for the purpose of providing a sealed relationship between the portion 28 and the inner surface of the bore 14. A mounting bracket 26 is also provided at each end of the cylinder assembly 10 for the purpose of mounting the same to a desired surface or other location. Each of the brackets 26 includes a pair of mounting holes 27 and cylinder connection means 23 for this purpose. Means are also provided in the form of the wedge element 24 and the set screws 25 at each end of the cylinder assembly for securing the elongated seal members in fixed relationship relative to the head assemblies 18. A fluid inlet/outlet port 22 is provided in each of the head assemblies 18 for the purpose of selectively providing fluid pressure to and from fluid chambers within the cylinder assembly 10.

The piston assembly 11 is adapted for reciprocal movement within the cylindrical bore 14 and includes a main piston body comprising a centrally located portion 33 and an end portion 30 positioned at each end. A piston bracket 31 is connected with the central portion 33 of the piston body and extends upwardly through the slot 15 as will be described in greater detail below. An elongated lower seal member 32 is adapted for insertion into a portion of the elongated slot 15 during operation for the purpose of successively sealing the slot during reciprocal movement of the piston. Each of the piston end portions 30 is provided with a ramp or guide portion 34 for guiding movement of the lower seal member 32 into the slot 15. An upper seal member 37 is also provided for insertion into the slot 15 to prevent dust or other contaminants from entering the cylinder 10. A cup seal or gland 35 is carried by each of the piston end portions 30 for forming a sealing relationship with the inner surface of the bore 14.

When the piston assembly 11 is positioned within the bore 14, the seals 35 engages the inner surface of the bore 14 in sealing relationship. Accordingly, a fluid chamber is defined in each end of the cylinder. One of the fluid chambers is connected to one of the fluid inlet/outlet ports 22, while the other fluid chamber is connected to the other of the fluid inlet/outlet ports 22. By controlling the supply and exhaust of fluid pressure to and from the ports 22, 22, the piston assembly 11 is caused to move reciprocally back and forth along the longitudinal axis of the cylinder 10.

As illustrated best in FIG. 3, the piston bracket includes a pair of spaced apart lower leg portions 36 connected to opposite sides of the central portion 33 of the piston body. As shown, these legs converge inwardly and upwardly to form the adjacent leg portions 38. The leg portions 38 extend from the interior of the cylinder member 13 through the elongated slot 15. In the preferred embodiment, these adjacent leg portions 38 are joined together by a weld or other similar means so that the two legs of the piston bracket 31 are fixed with respect to one another. Upon exiting from the cylinder member 13, the adjacent leg portions 38 separate and continue to extend upwardly to form two upwardly extending, spaced apart connector legs or portions 39. As shown in FIGS. 1 and 3, the connector portions 30 of the piston bracket 31 extend upwardly in spaced apart relationship and extend in a direction generally parallel to the longitudinal axis of the cylinder member 13. Each of the connector members 39 includes a pair of openings 40 for connection to the mounting bracket assemblies 12 in the manner which will be discussed in greater detail below.

With continuing reference to FIGS. 1, 2 and 3, the mounting bracket assembly 12 includes a centrally located portion 41 extending in a direction generally parallel to the longitudinal axis of the cylinder 10, a pair of holes or openings 51 extending transversely through the portion 41, and a pair of support or guide arms 42 and 44 extending outwardly and downwardly from the central portion 41 to a point where the ends of the arms 42 and 44 are spaced outwardly from corresponding side wall portions 43 and 47 of the cylinder member 13. This relationship between the arms 42 and 44 and the cylinder side walls 43 and 47 is illustrated best in FIG. 3.

Means are provided in the central portion 41 for facilitating the limited flexing movement of the arms 42 and 44 relative to one another. In the preferred embodiment, this means comprises the pair of longitudinally extending slots or recessed portions 46. These slots or recessed portions 46 are positioned in the central portion 41 and extend throughout the entire length of the mounting bracket 12 in a direction generally parallel to the longitudinal axis of the cylinder member 13. As illustrated best in FIG. 3, these slots 46 extend upwardly to a point higher than the transverse openings 51. The existence of the slots 46 form an area of reduced width to thereby permit limited flexing of the legs 42 and 44 relative to the central portion 41, and thus limited movement of the outer ends of the arms 42 and 44 toward and away from one another.

Means are also provided for causing limited movement of the arms 42 and 44 relative to one another. In the preferred embodiment, this means comprises the pair of threaded members 52 extending through the openings from one side of the mounting bracket to the other and the corresponding threaded nuts 54. By tightening the nuts 54 onto the members 52, the arms 42 and 44 are caused to flex inwardly toward one another. When the nuts 54 are loosened, the arms 42 and 44 spread away from one another because of the prestress formed in the construction of the bracket 12. The extend of such inward movement can be controlled and adjusted by appropriate rotation of the nuts 54. It should be noted that the carrier bracket 12, and thus the arms 42 and 44, are preferably prestressed in their outermost position (the position in which their ends are furthest from each other) so that tightening of the nuts 54 acts against this prestress force.

The central portion 41 includes a downwardly or inwardly extending portion 53 for insertion between the upper ends of the connector members 39. When fully assembled, the connector members or legs 39 extend into the slots 46 and are retained in that position by the threaded members 52 extending through the holes 51 in the bracket 12 and the holes 40 in the members 39. A plurality of threaded holes 72 are provided in the top surface of the bracket 12 for connection of the bracket to the work piece.

The outermost end of each of the arms 42 and 44 has an inner surface facing a respective side wall 43 and 47 of the cylinder member 13. Each of these inner surfaces is provided with a bearing rod support surface 62. In the preferred embodiment, this surface 62 has a configuration corresponding substantially to the exterior configuration of the bearing rod 48 and extends the entire length of the bracket 12. The preferred configuration is a cylindrical shape.

Each end of the mounting bracket 12 is provided with an end plate or end cap 45 which is connected with its respective end of the mounting bracket 12 by the threaded member 60. The member 60 passes through an opening 59 in each of the end caps 45 and into a corresponding threaded opening 61 in the central portion 41 of the mounting bracket 12.

Figure 4:
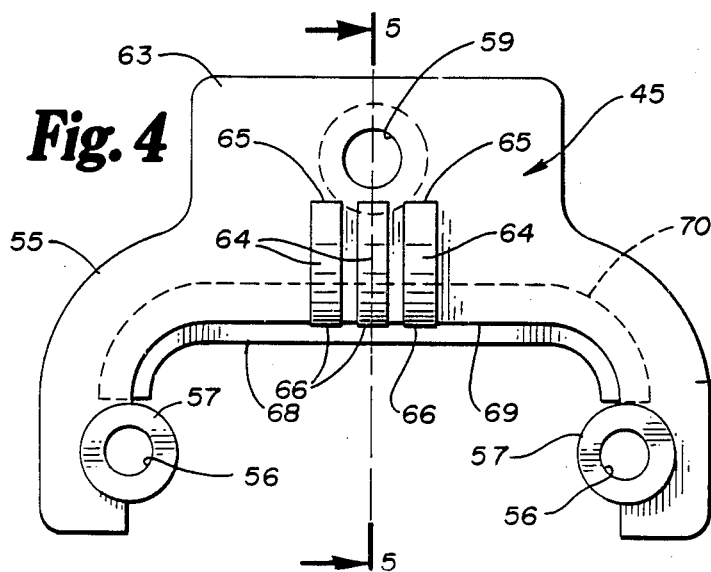
FIG. 4 is an elevational front view of the end cap for one embodiment of the carrier bracket of the present invention.
Figure 5:
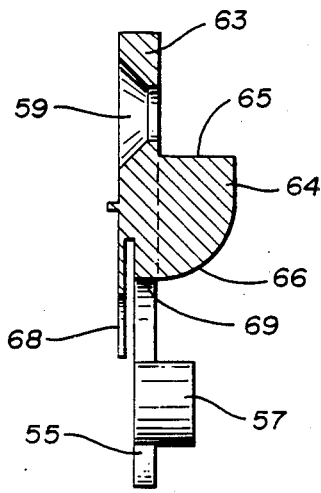
FIG. 5 is a sectional view of the end cap of the carrier bracket as viewed along the section line 5—5 of FIG. 4.

As illustrated generally in FIG. 1, and more specifically in FIGS. 4 and 5, each of the end caps 45 includes a center portion 63 and a pair of outwardly extending legs 55 which extend outwardly in opposite directions from the center portion 63. The legs 55 are shaped in substantial conformance with the shape of the arms 42 and 44. Positioned at the outer ends of each of these legs 55 is a bearing rod connecting portion 57 having an opening 56 extending therethrough. A pair of elongated bearing rods 48 and 49 are adapted for respective connection to these portions 57 by threaded members 58 extending through the openings 56 and into threaded engagement with the threaded openings 50. It should be noted that the bearing rods 48 and 49 are maintained in a position generally parallel to the longitudinal axis of the cylinder 10 and are secured to the end plates 45 by the threaded members 58 extending into the rods in a direction generally parallel to the longitudinal axis of the cylinder 10. In the preferred embodiment, the bearing rods 48 and 49 are generally cylindrical elements; thus, the bearing support surfaces 62 and the bearing surfaces 16 have a partial cylindrical configuration.

As illustrated best in FIGS. 4 and 5, each end cap 45 includes means in the form of the plurality of ramp or wedge elements 64 for urging the upper seal member 37 (FIGS. 1 and 2) into the slot 15 during reciprocal movement of the piston. Each of these elements 64 includes an upwardly facing flat portion 65 for engagement with a lower surface portion of the central bracket portion 41 and curved surface 66. The curved surface 66 engages the top surface of the seal member 37 and forces it into the slot 15 during operation. The ramp member 17 disposed between the connector legs 39 of the piston bracket urges the seal member 37 out of the slot 15 during reciprocal movement of the piston to allow the adjacent legs 38 of the piston to extend through the slot 15.

Each end cap 45 is also provided with a wiper blade 68 for wiping the top surface of the cylinder member 13 during reciprocal movement of the piston. As shown in FIG. 5, this wiper blade comprises a thin piece of plastic material 68 integrally formed with the remainder of the end cap 45 and extending below the lower edge of the curved surfaces 66 and below the edge 69. The wiper blade functions to wipe dust and other contaminants from the cylinder member 13 during operation. A recess 70 is provided to give the blade 68 additional flexibility.

In the preferred embodiment, the mounting bracket 12 is constructed of aluminum or some other metal or material which is sufficiently strong to handle the forces and stresses which are created as a result of reciprocal movement of the piston assembly and corresponding transfer of that movement to the work piece. The material from which the bracket 12 is constructed must also be capable of flexing in the manner described above to accomplish the adjustment and control of the tolerances and clearances between the bearing rods 48 and 49 and the bearing surfaces 16 as will be described in greater detail below.

The end plates 45 can also be constructed from a variety of materials providing such materials are sufficiently flexible to permit the legs 55 to flex in response to flexing movement of the arms 42 and 44 as a result of tightening or loosening of the threaded members 52 and 54. In the preferred embodiment, the end clamps are constructed of a hard plastic material such as Nylon. It has been found that such a material provides acceptable strength and flexibility for the purposes of the present invention.

The depth of the slots or recessed portions 46 in the central portion 41 of the bracket 12 must also be deep enough to permit limited flexing of the arms 42 and 44 as a result of tightening or loosening of the threaded members 52 and 54. This flexing ability provides significant improvements in controlling the tolerances and clearances between the bearing rods 48, 49 and the bearing grooves or surfaces 16 on the side walls 43 and 47 of the cylinder member 13. Thus, the arms 42 and 44 must be capable of limited flexing movement toward and away from one another in response to tightening or loosening of the threaded members 52 and 54 to provide this control.

In the structure of the preferred embodiment, the middle section 53 of the central portion 41 of the control bracket assembly 12 has a width which closely approximates the distance between the connecting members 39 of the piston bracket. Thus, this middle section 53 fits snugly between the connector members 39, 39. To provide sufficient tolerance and clearance control, it is also preferable for the slots 46, 46 to have a width wider than the thickness of the connector members 39 to allow for the above mentioned flexing.

It is also contemplated that instead of the specific structure illustrated in the preferred embodiment, various other structure structures could also be utilized in providing the desired flexibility between the arms 42 and 44. For example, it is contemplated that a structure could be devised in which only a single slot (rather than the pair of slots 46) could be provided in the central portion 41 to provide the desired flexibility between the arms 42 and 44.

The bearing rods 48 and 49 can also be constructed from a variety of materials. In general, however, these materials should preferably be constructed of a relatively hard plastic material having internal lubricants or additives for the purpose of reducing the sliding coefficient of friction between the rods 48 and 49 and the bearing surfaces 16. By reducing this coefficient of friction, undue drag is minimized. The material from which the rods 48 and 49 are constructed should also be sufficiently resistant to abrasion so as to minimize the wear rate. The material should also be hard enough to prevent undesirable deformation of the rod as the tolerance and clearance is being adjusted via the threaded members 52 and 54. Although the preferred embodiment shows the bearing rods 48 and 49 to be cylindrical, it is contemplated that various other cross-section configurations could be utilized as well.

Figure 6:
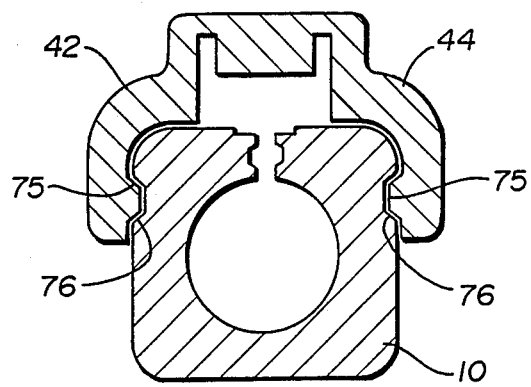
FIGS. 6-9 are sectional views, with parts removed, showing variations of a further embodiment of the guide surfaces between the carrier bracket and cylinder walls.
Figure 7:
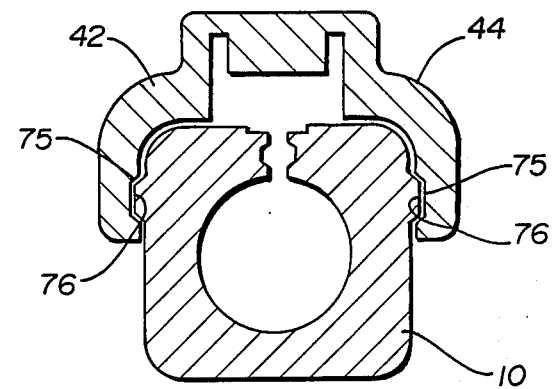
Figure 8:
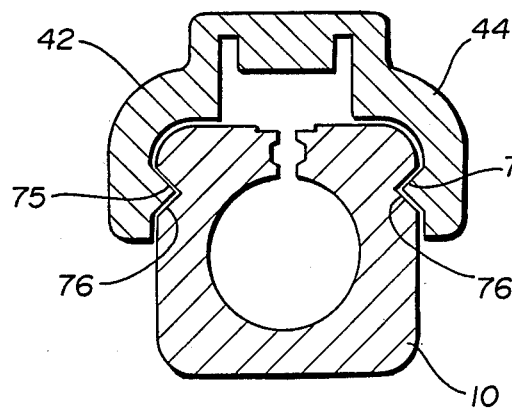
Figure 9:
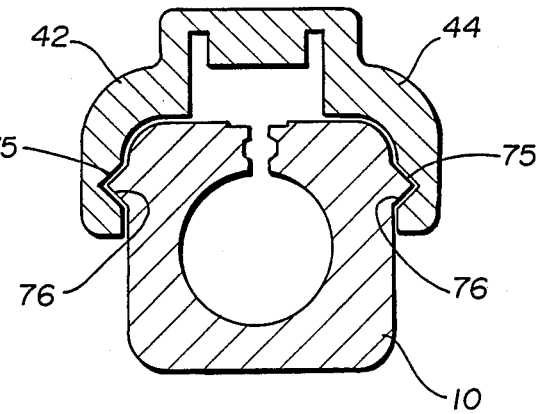
Figure 10:
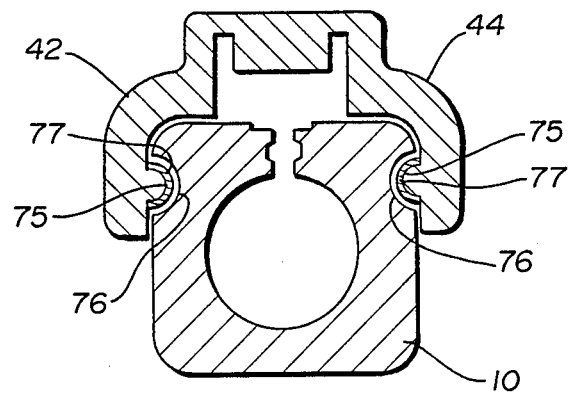
FIG. 10 is a sectional view, with parts removed, showing a further variation of a pair of guide surfaces between the carrier bracket and cylinder walls.

FIGS. 6-10 show variations of a further embodiment of the present invention. In each of these variations, the outwardly extending arms 42 and 44 of the carrier bracket are provided with a guide surface 75 operatively associated with a corresponding guide surface 76 on the cylinder 10. In FIGS. 6-10, the bearing rods 48, 49 have been eliminated and the guide surfaces 75 have been integrally formed directly in the arms 42 and 44. In FIGS. 6, 8 and 10 the guide surfaces 75 are protruding, while in FIGS. 7 and 9 the surfaces 75 are recessed. In contrast, the surfaces 76 in FIGS. 6, 8 and 10 are recessed, while in FIGS. 7 and 9 such surfaces are protruding. It is contemplated that the surfaces 75 and 76 could embody various configurations; however, they should compliment one another to provide for the desired guiding relationship.

FIG. 10 illustrates a variation of an embodiment in which the guide surface 75 is formed by a low friction coating or strip 77. In an embodiment of the type illustrated in FIG. 10, the surface 75 can be formed by providing a portion of the arm 42 or 44 with a low friction coating such as Teflon or such surface can be formed by a separate strip of low friction material which is secured to the arms 42 or 44 by an adhesive or other connecting means.

Having described the structure of the various embodiments of the present invention in detail, the operation can be understood as follows. In assembling the device of the present invention, the piston assembly 11 is inserted into the cylinder member 13 and one of the head assemblies 18 is connected to an end of the cylinder 10. The mounting bracket assembly 12 is then assembled and mounted to the cylinder 10 by guiding the bearing rods 48 and 49 into engagement with the bearing surfaces 16, or the surfaces into engagement with the surfaces 76, on each side of the cylinder 10. The other head assembly 18 is then connected with the end of the cylinder member 13. The mounting bracket assembly 12 is then moved to a position corresponding to that of the piston assembly 11 so that the openings 51 in the mounting bracket align with the openings 40 in the connecting members of the piston bracket. The threaded members 52 are then inserted through these holes and the threaded nut 54 connected therewith. These threaded members 52 and 54 are then tightened, thereby causing compression of the arms 42 and 44 and the legs 55, 55. This moves the bearing rods 48 and 49, or the guide surfaces 75, into a guiding and bearing engagement with the surfaces 16, or 76, in the side walls of the cylinder member 13. The exact clearance and tolerance can be obtained merely by varying the rotation of the threaded members 52 and 54.

Although the description of the various embodiments of the present invention has been quite specific, it is contemplated that various changes could be made without deviating from the spirit of the present invention. Accordingly, it is intended that the scope of the present invention be dictated by the appended claims rather than by the description of the preferred embodiments.

I claim:

1. A carrier bracket usable with a power cylinder of the type having an elongated cylinder member and a reciprocally movable piston therein for transfering reciprocal movement of said piston to a desired work piece comprising:

a central bracket portion;

a pair of guide arms extending outwardly from said central bracket portion so that the outermost ends of said arms each include an inner surface facing the inner surface of the other of said arms;

each of said guide arms being provided with an elongated guide surface, said guide surfaces of said arms extending generally parallel to one another;

means facilitating the limited flexing movement of at least one of said arms relative to said central bracket portion so as to facilitate the limited selective movement of said arms toward and away from one another; and means for causing the limited selective movement of said arms toward and away from one another.

2. The carrier bracket of claim 1 wherein said means facilitating the limited flexing movement of said arms includes an area of reduced thickness formed in said central portion and extending the entire length of said central portion.

3. The carrier bracket of claim 2 wherein said area of reduced thickness comprises at least one slot formed in said central portion.

4. The carrier bracket of claim 3 including a pair of slots formed in said central portion and extending the entire length thereof.

5. The carrier bracket of claim 1 wherein said means for causing the limited selective movement of said arms includes a threaded member extending between portions of said arms.

6. The carrier bracket of claim 3 wherein said means for causing the limited selective movement of said arms includes a threaded member extending between portions of said arms.

7. The carrier bracket of claim 1 wherein each of said guide surfaces is integrally formed with its respective guide arm.

8. The carrier bracket of claim 1 wherein each of said guide surfaces comprises a low friction coating.

9. The carrier bracket of claim 1 wherein each of said guide surfaces comprises a guide strip of low friction material connected with its respective guide arm.

10. A power cylinder comprising:

an elongated cylinder member having an elongated bore extending therethrough and a pair of side walls;

a piston disposed within said bore and adapted for reciprocal movement therein;

an elongated slot formed in said cylinder member and extending in a direction generally parallel to the longitudinal axis of said cylinder member;

transfer means for transfering reciprocal movement of said piston to a work piece comprising a carrier bracket having:

a central bracket portion;

a pair of guide arms extending outwardly from said central bracket portion so that the outermost ends of said arms are spaced outwardly from a corresponding side wall portion of said cylinder member and include an inner surface facing said corresponding side wall portion;

each of said guide arms being provided with an elongated guide surface, said guide surfaces of said arms adapted for sliding engagement relative to corresponding guide surfaces on said cylinder side walls and extending generally parallel to one another and the longitudinal axis of said cylinder member;

means facilitating the limited flexing movement of at least one of said arms relative to said central bracket portion so as to facilitate the limited selective movement of said arms toward and away from one another; and means for causing the limited selective movement of said arms toward and away from one another.

* * * * *